(No Model.)
J. A. MOSHER, W. N. BEARDSLEY & A. D. MOULTON.
CYCLOMETER.
No. 531,269. Patented Dec. 18, 1894.
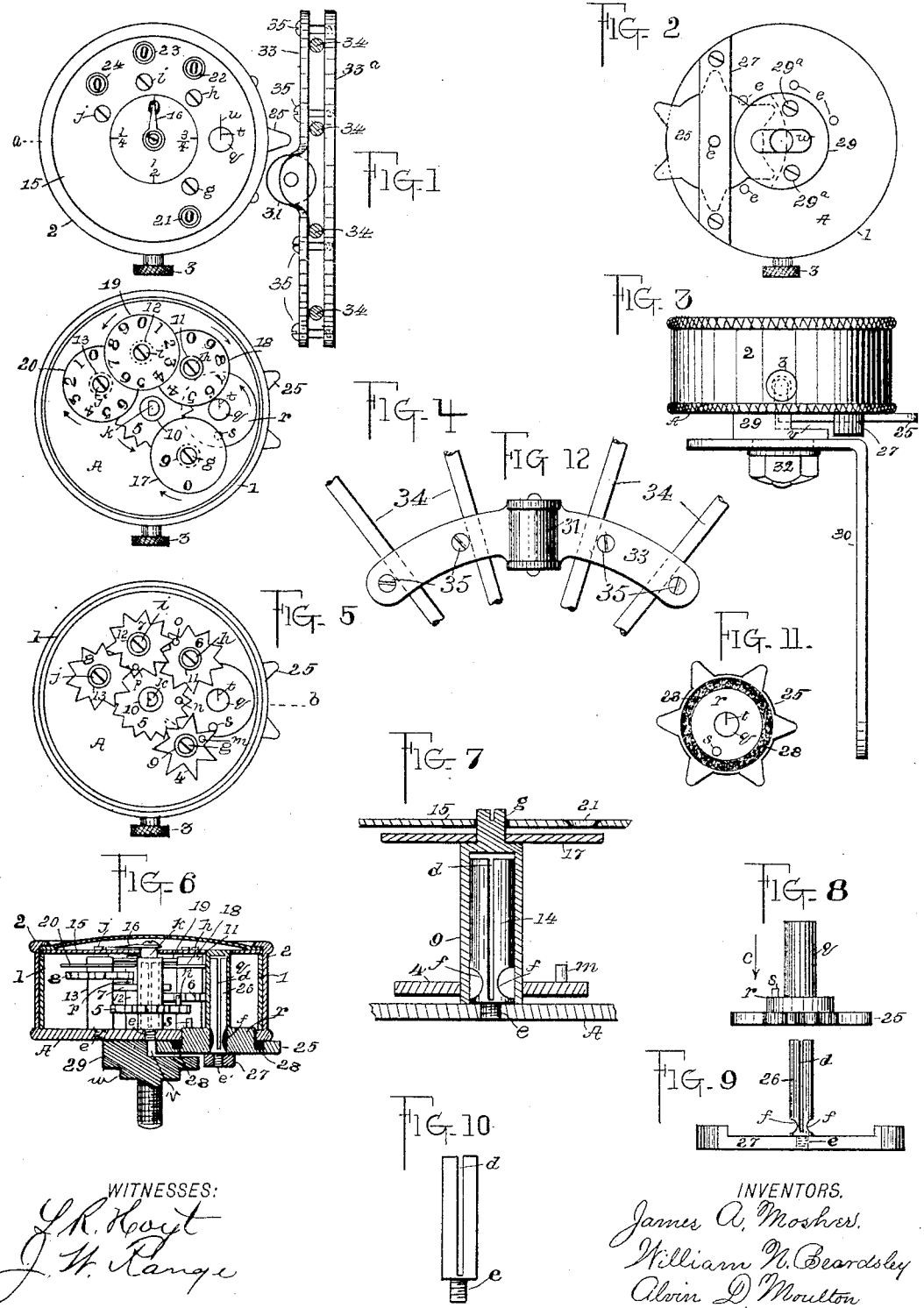
WITNESSES:
J. R. Hoyt
J. W. Range
INVENTORS.
James A. Mosher
William N. Beardsley
Alvin D. Moulton
By their ATTORNEY.
Geo. D. Phillips
THE NORRIS PETERS CO., PHOTO-LITHO., WASHINGTON, D. C.

UNITED STATES PATENT OFFICE.

JAMES A. MOSHER, OF BOSTON, MASSACHUSETTS, AND WILLIAM N. BEARDSLEY AND ALVIN D. MOULTON, OF BRIDGEPORT, CONNECTICUT, ASSIGNORS TO MARCELLUS HARTLEY AND MALCOLM GRAHAM, OF NEW YORK, N. Y.

CYCLOMETER.

SPECIFICATION forming part of Letters Patent No. 531,269, dated December 18, 1894.

Application filed June 29, 1894. Serial No. 516,131. (No model.)

*To all whom it may concern:*

Be it known that we, JAMES A. MOSHER, a resident of Boston, county of Suffolk, State of Massachusetts, and WILLIAM N. BEARDSLEY and ALVIN D. MOULTON, residents of Bridgeport, county of Fairfield, State of Connecticut, citizens of the United States, have invented certain new and useful Improvements in Cyclometers, of which the following is a specification.

Our device relates to certain new and useful improvements in cyclometers, an instrument designed for registering the distance traveled by a wheeled vehicle, such as a velocipede or bicycle, through the medium of a moving part of said vehicle which actuates a registering mechanism by its movement.

In our device each of the wheels or moving parts of the registering mechanism is provided with an elongated hub or sleeve which is mounted upon a split supporting stud fixed to the bottom of the case, thus making a frictional engagement for such wheels or gears sufficient to maintain them in proper relation with each other when registering, and also enable them to be independently returned to zero for a fresh start.

Another important feature of construction consists in making the instrument dust-proof, thereby increasing its wearing qualities.

In order that those skilled in the art to which the invention appertains may fully understand its construction and operation, reference is had to the accompanying drawings, in which—

Figure 1 represents an upper plan or face view of the cyclometer as it appears when attached to the front wheel of a bicycle, so as to be readily seen by the rider; also a pair of clamping plates embracing four spokes of the wheel to which it is securely fastened, one of which plates carries a rubber striker wheel in readiness to engage the star wheel of the cyclometer mechanism. Fig. 2 is the reverse side of the cyclometer showing the manner of supporting the star or driving wheel against the bottom of the instrument. Fig. 3 is a side elevation of the cyclometer mounted upon its supporting bracket. Fig. 4 is an upper plan view of the cyclometer with the cover and large dial face removed therefrom, showing the small registering dials mounted upon several of the hubs of the registering wheels. Fig. 5 is also a view of the interior of the cyclometer, showing the train of wheels comprising the registering mechanism with the registering dials removed therefrom. Fig. 6 is a vertical sectional view of the case and cover of the cyclometer through line *a* of Fig. 1 and of the star or driving wheel and its sleeve through line *b* of Fig. 5. Fig. 7 is a detail sectional view of a registering wheel and its sleeve mounted on a split supporting stud attached to a broken section of the bottom of the cyclometer case; broken section of the large overlying dial plate with a reduced portion of the wheel sleeve projecting through the same; sectional view of the small registering dial mounted on a shouldered portion of said sleeve. Fig. 8 is a detail side elevation of the driving wheel and its elongated sleeve. Fig. 9 is the supported stud for the driving wheel mounted on a bracket to be attached to the bottom of the case. Fig. 10 is a detail view of one of the bearing studs. Fig. 11 is an upper plan view of the driving wheel, looking in the direction of arrow *c*, Fig. 8, showing the manner of attaching the dust-proof ring or washer. Fig. 12 is a detail side elevation of the curved clamping plates carrying the striker wheel; also broken section of four spokes of a bicycle wheel embraced by said plates.

Its construction and operation are as follows: 1 represents the cyclometer case; 2, the cover therefor; 3, retaining screw for said cover; 4, 5, 6, 7 and 8, Fig. 5, registering wheels, each of which is mounted on the elongated sleeves 9, 10, 11, 12 and 13. These sleeves are, in turn, each mounted on a split supporting stud similar to the one marked 14 in Fig. 7. As these supporting studs are all constructed alike a brief description of one will answer for all. These studs are provided with the narrow central kerf *d* of equal width throughout their entire length, which kerf extends nearly to the threaded end *e*, which threaded end is firmly screwed into the bottom A of the case. The bore of the sleeve 9 is made a trifle smaller in diameter than the diameter of the stud 14, so as to create sufficient frictional engagement between the two and thus permit each wheel to be rotated freely on its own stud and yet effectually prevent its being accidentally shifted thereon. This feature enables the several wheels of the train to be rotated with the same accuracy as if their teeth registered together, while each wheel may be independently returned to zero or starting point, in the manner presently to be described.

To give greater resiliency to the split supporting studs and enable them to bear equally at the top and bottom, the sides are preferably thinned or reduced by means of the circular cuts $f$.

The upper end of the wheel sleeve, Fig. 7, is preferably closed, as shown, the upper reduced portion $g$ projecting through a hole in the large dial plate 15 and such projecting end is provided with a screw-driver slot, as shown, whereby each wheel is independently moved in any direction. The sleeves 11, 12 and 13 each have similar reduced ends $h, i, j$, Fig. 1, also projecting through dial plate 15 and for the same purpose, while the reduced end $k$ of sleeve 10 (see also Figs. 4, 5 and 6) is provided with the hand 16, Fig. 1, for recording fractions of a mile on the large dial plate 15.

All of the registering wheels are arranged on different planes (see Figs. 5 and 6) and each, with the single exception of wheel 8, carries driver pins $m, n, o, p$, which engage with the teeth of the several wheels to rotate them.

Rigidly supported on the sleeves 9, 11, 12 and 13 are the small registering dials 17, 18, 19 and 20, carrying numbers thereon which are seen through peep holes 21, 22, 23 and 24 of dial plate 15, Fig. 1, as they are brought to view. The dial 17 has simply one cipher thereon for the sole purpose of bringing wheel 4 to zero or starting point.

The star or driving wheel 25, Figs. 6 and 8, is, with its sleeve $q$, made of one piece of metal and is rotatably mounted upon the split supporting stud 26, the lower end of which stud is firmly screwed into the bracket 27 attached to the outside of the bottom A of the case. The enlarged boss or hub $r$ of said wheel projects through a hole in the bottom of the case therefor, and carries the driver pin $s$ to engage with the teeth of wheel 4, as shown at Fig. 5.

Referring to Figs. 6 and 11, 28 is a felt washer let into a circular recess of the wheel 25 so that, when said wheel is assembled between the bottom of the case and bracket 27 the washer will bear against said bottom and thus effectually exclude the dust from the interior of the cyclometer.

In resetting the wheels of the train back to zero it is necessary that the driving wheel 25 should also be placed in such relative position with wheel 4 so as to be properly timed therewith. For this purpose, the straight mark $t$ is made in the end of the hub $q$, which mark, when coincident with mark $u$ on the dial plate 15, Fig. 1, will indicate the zero position of said wheel. In said figure all of the several moving parts are represented as at zero or starting point.

Referring to Figs. 2 and 3, 29 is a supporting base connected to the bottom of the case by screws 29ª. This base has the cut-away portion $v$ to permit a free movement of wheel 25. The elongated squared portion $w$ of said base is arranged to fit an elongated hole or slots (not shown) in the short horizontal leg of the supporting bracket 30, which will prevent the cyclometer being turned on its support and yet may be adjusted to and from the striker wheel 31, Fig. 1, the nut 32 securing the instrument firmly in place, while the main portion of said bracket is secured to the frame of the bicycle and is made vertically adjustable thereon.

The semi-circular clamping plates 33, 33ª, Figs. 1 and 2, have substantially the same curvature as the wheel at that point, which results in their being able to embrace a greater number of spokes in proportion to the surface covered, being equally adapted for tangential, straight or wooden spokes. For the latter purpose the rear plate 33ª may be dispensed with and the binding screws 34 attached directly to said spokes.

Fig. 10 shows a stud constructed like the others, with the exception of the cut-away portion or groove in the sides near the bottom. In some cases we may choose to employ a stud so constructed but in general we prefer to cut the side grooves $f$ shown in Figs. 6, 7 and 8, as this will give increased flexibility.

It will be observed, from the above description, that our cyclometer possesses many necessary and important features which make it a useful, accurate and durable device for registering purposes.

Having thus described our invention, what we claim is—

1. A cyclometer for bicycles, comprising in combination, a suitable casing and cover therefor, a series of supporting studs having a lower threaded end whereby they are rigidly secured to the inside bottom of the case, said studs divided into two semi-cylindrical parts by a narrow central kerf extending nearly to the shouldered portion above said threaded end and of equal width throughout its length, so as to give resiliency to the semi-cylindrical parts of said studs, a series of registering wheels having elongated hubs, a straight internal bore slightly smaller in diameter than said studs, so that when mounted thereon the semi-cylindrical parts thereof will be compressed so as to form a straight frictional bearing surface substantially the entire length of said studs, the upper portion of said hubs of the registering wheels being closed to exclude the dust from the bearing surfaces, and also to provide means for independently rotating each of said wheels without removing the overlying dial, substantially as shown and described.

2. The combination, in a cyclometer, with the case 1 of the driving wheel 25 and its elongated hub $q$ extending into the case, one side of said wheel bearing against the outside bottom thereof, a dust-proof washer interposed between said wheel and case, a circular retaining groove or recess therefor, said wheel and its hub having a central bore, supporting stud 26 therefor, bracket 27 to which said stud is secured, which bracket is, in turn, secured to the bottom of the case, as set forth.

3. A cyclometer, comprising in combination, a case and cover therefor, a train of registering wheels having elongated hubs closed at the upper end, supporting studs upon which said hubs are rotatably mounted and maintained thereon by the frictional contact of said studs produced by means of a narrow central kerf of equal width throughout their length, the upper end of said hubs being closed to exclude the dust and such closed ends projecting through the large overlying dial plate 15, and means for engaging such closed projecting ends to turn the registering wheels without removing said dial, small registering dials mounted on said hubs, peep holes in the overlying dial plate 15 to read the figures on said registering dials, driving wheel constructed as shown to rotate outside and against the bottom of the case, a dust-proof washer interposed between said case and wheel, a supporting stud therefor mounted upon an outside bracket, means whereby all the wheels of the train are brought into engagement with each other, substantially as set forth.

4. A cyclometer for bicycles, comprising in combination, a suitable casing and cover therefor, a series of supporting studs and means for securing them rigidly to the inside bottom of the case, said studs divided into two semi-cylindrical parts by a narrow central kerf extending nearly to the shouldered portion of said studs and of equal width throughout their length, so as to give the proper resiliency to the semi-cylindrical parts thereof, a series of registering wheels having elongated hubs and a straight cylindrical bore slightly smaller in diameter than said studs so that, when mounted thereon, the semi-cylindrical parts of said studs will be compressed so as to form a straight frictional bearing surface substantially the entire length of said studs, the upper portion of said hubs of the registering wheels closed to exclude dust from the bearing surfaces, as described and set forth.

Signed at Boston, in the county of Suffolk and State of Massaschusetts, this 22d day of June, A. D. 1894.

JAMES A. MOSHER.

Witnesses as to the signature of James A. Mosher:
GEO. D. PHILLIPS,
C. F. BROWN.

Signed at Bridgeport, in the county of Fairfield and State of Connecticut, this 19th day of June, A. D. 1894.

WILLIAM N. BEARDSLEY.
ALVIN D. MOULTON.

Witnesses as to the signatures of William N. Beardsley and Alvin D. Moulton:
EDWARD A. JONES,
L. M. SLADE.